(12) United States Patent
Laine et al.

(10) Patent No.: US 9,891,305 B2
(45) Date of Patent: *Feb. 13, 2018

(54) CHIP-SCALE STAR TRACKER

(71) Applicant: THE CHARLES STARK DRAPER LABORATORY, INC., Cambridge, MA (US)

(72) Inventors: Juha-Pekka Laine, Boston, MA (US); Gregory P. Blasche, Burlington, MA (US); Murali V. Chaparala, Newton, MA (US); Robin Dawson, Watertown, MA (US); Benjamin Lane, Grafton, MA (US); Stephen P. Smith, Acton, MA (US); Erik Waldron, Concord, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/172,481

(22) Filed: Jun. 3, 2016

(65) Prior Publication Data

US 2016/0282441 A1 Sep. 29, 2016

Related U.S. Application Data

(63) Continuation of application No. 14/693,542, filed on Apr. 22, 2015, now Pat. No. 9,372,250, which is a
(Continued)

(51) Int. Cl.
*G01B 11/02* (2006.01)
*G01C 21/02* (2006.01)
(Continued)

(52) U.S. Cl.
CPC .............. *G01S 3/7867* (2013.01); *G01B 9/06* (2013.01); *G01C 21/025* (2013.01); *G01S 3/785* (2013.01);
(Continued)

(58) Field of Classification Search
CPC ..... G01B 2290/10; G01C 21/025; G01S 3/78; G01S 3/781; G01S 3/785; G01S 3/7867; G02B 6/0288; G02B 6/34
See application file for complete search history.

(56) References Cited

U.S. PATENT DOCUMENTS 4,682,024 A 7/1987 Halldorsson et al.
5,602,384 A 2/1997 Nunogaki et al.
(Continued)

FOREIGN PATENT DOCUMENTS

DE 3517650 A1 11/1986

OTHER PUBLICATIONS

Extended European Search Report for Corresponding European Application No. 14817171.3 dated Jan. 4, 2017.
(Continued)

*Primary Examiner* — Michael A Lyons
(74) *Attorney, Agent, or Firm* — Lando & Anastasi, LLP

(57) ABSTRACT

A chip scale star tracker that couples starlight into a lightguide such that the angle of incidence partially determines the mode of propagation of the starlight in the lightguide. A baffle system integrated with the lightguide prevents propagation of light incident from a predetermined range of angles.

16 Claims, 9 Drawing Sheets

Related U.S. Application Data continuation of application No. 13/930,032, filed on Jun. 28, 2013, now Pat. No. 9,019,509.

(51) Int. Cl.

| | | |
|---|---|---|
| G01C 21/24 | (2006.01) |
| G01J 1/20 | (2006.01) |
| G01S 3/786 | (2006.01) |
| G02B 6/028 | (2006.01) |
| G02B 6/34 | (2006.01) |
| G01S 3/785 | (2006.01) |
| G01B 9/06 | (2006.01) |
| G02B 6/124 | (2006.01) |
| G02B 6/122 | (2006.01) |
| G02B 6/26 | (2006.01) |
| G02B 6/35 | (2006.01) |
| G02B 6/12 | (2006.01) |

(52) U.S. Cl.
CPC ........... *G02B 6/0288* (2013.01); *G02B 6/122* (2013.01); *G02B 6/124* (2013.01); *G02B 6/262* (2013.01); *G02B 6/34* (2013.01); *G02B 6/3548* (2013.01); *G01B 2290/10* (2013.01); *G02B 2006/12147* (2013.01)

(56) References Cited

U.S. PATENT DOCUMENTS

| | | | |
|---|---|---|---|
| 5,784,156 | A | 7/1998 | Nicholson |
| 6,310,338 | B1 | 10/2001 | Blasing |
| 8,093,673 | B2 | 1/2012 | Gilton |
| 9,019,509 | B2 | 4/2015 | Laine et al. |
| 9,372,250 | B2 * | 6/2016 | Laine ................... G01C 21/025 |
| 2004/0008936 | A1 | 1/2004 | Giboney et al. |
| 2007/0201792 | A1 * | 8/2007 | Lange ................... G02B 6/125 385/29 |
| 2009/0290837 | A1 | 11/2009 | Chen et al. |
| 2010/0002242 | A1 | 1/2010 | Hutchin |
| 2010/0100322 | A1 | 4/2010 | Leijtens |
| 2010/0186818 | A1 | 7/2010 | Okorogu et al. |
| 2010/0309459 | A1 | 12/2010 | Fattal et al. |
| 2010/0329603 | A1 | 12/2010 | Kopp |

OTHER PUBLICATIONS

Backlund, Johan et al., "Multifunctional Grating Couplers for Bidirectional Incoupling into Planar Waveguides", IEEE Photonics Technology Letters, vol. 12, No. 3, Mar. 2000.
Kasha, M.A. et al., "A Study of Coupling Interactions in Finite Arbitrarily-Shaped Grooves in Electromagnetic Scattering Problem", Optics Express, vol. 18, No. 3, Feb. 1, 2010.
Bub, Thomas et al., "Sub-Wavelength Surface Gratings for Light Redirection in Transparent Substrates", Applied Physics Letters vol. 101, No. 043109, downloaded Feb. 22, 2013.
Burch, Jordan et al., "Imaging Skins: An Imaging Modality with Ultra-Thin Form Factor", Optics Letters, vol. 37. No. 14, Jul. 15, 2012, pp. 2856-2858.
Cheng, Zhenzhou et al., "Focusing Subwavelength Grating Coupler for Mid-Infrared Suspended Membrane Waveguide", Optics Letters, vol. 37, No. 7, Apr. 1, 2012.
Halir, R. et al., "Colorless Directional Coupler with Dispersion Engineered Sub-Wavelength Structure", Optics Express, vol. 20, No. 12, Jun. 4, 2012.
Halir, Robert et al., "Waveguide Grating Coupler with Subwavelength Microstructures", Optics Letters, vol. 34, No. 9, May 1, 2009.
Huang, Yin et al., "Compact Slit-Based Couplers for Metal-Dielectric-Metal Plasmonic Waveguide", Optics Express, vol. 20, No. 20, Sep. 24, 2012.
Liu, Chun-Wei et al., "Sub-Wavelength Gratings Fabricated on a Light Bar by Roll-to-Roll UV Embossing Process", Optics Express vol. 19, No. 12, Jun. 6, 2011.
Monnini et al., System on Chip Development for Attitude Sensors. In Monnini et al., System on Chip Development for Attitude Sensors. In Proceedings of 7th International ESA Conference on Guidance, Navigation & Control Systems, pp. 2-5, Jun. 2008. [Retrieved on: Aug. 27, 2014] Retrieved from internet: <URL: ftp://ftp.elet.polimi.it/users/Marco.Lovera/ESAGNCO8/S05/03_Monnini.pdf >, entire document.
Park, Seung Ryong et al., "Grating Micro-Dot Patterned Light Guide Plates for LED Backlights", Optics Express, vol. 15, No. 6, Mar. 19, 2007.
Ricciardi, Armando et al., "Broadband Mirrors in the Near-Infrared Based on Subwavelength Gratins in SOI", IEEE Photonics Journal, vol. 2, No. 5, Oct. 2010.
Scheerlinck, Stijn et al., "Efficient, Broadband and Compact Metal Grating Couplers for Silicon-on-Insulator Waveguides", Optics Express, vol. 15, No. 15, Jul. 23, 2007.
Siitonen, Samuli et al., "A Double-Sided Grating Coupler for Thin Light Guides" Optics Express, vol. 15, No. 5, Mar. 5, 2007.
Siitonen, Samuli et al., "Coupling of Light from an LED into a Thin Light Guide by Diffractive Gratings", Applied Optics, vol. 43, No. 30, Oct. 20, 2004.
Siitonen, Samuli et al., "White LED Light Coupling into Light Guides with Diffraction Gratings", Applied Optics, vol. 45, No. 12, Apr. 20, 2006.
Valner. Characterization of Custom Built Sun Sensors for ESTCUBE-1. University of Tartu. 18 1-1, Jun. 2013. [Retrieved on: Aug. 27, 2014] Retrieved from internet: <URL: <http://dspace.utlib.ee/dspace/bitstream/handle/10062/30981/Robert_Valner.pdf>>, entire document.
Vermeulen, D. et al., "High-Efficiency Fiber-to-Chip Grating Couplers Realized Using an Advanced CMOS-Compatible Silicon-On-Insulator Platform" Optics Express, vol. 18, No. 17, Aug. 16, 2010.
Xiao, Zhe et al., "Design for Broadband High-Efficiency Grating Couplers" Optics Letters, vol. 37, No. 4, Feb. 15, 2012.
Yu, Nanfang et al., "Flat Optics: Controlling Wavefronts with Optical Antenna Metasurfaces" IEEE, 2011.

\* cited by examiner

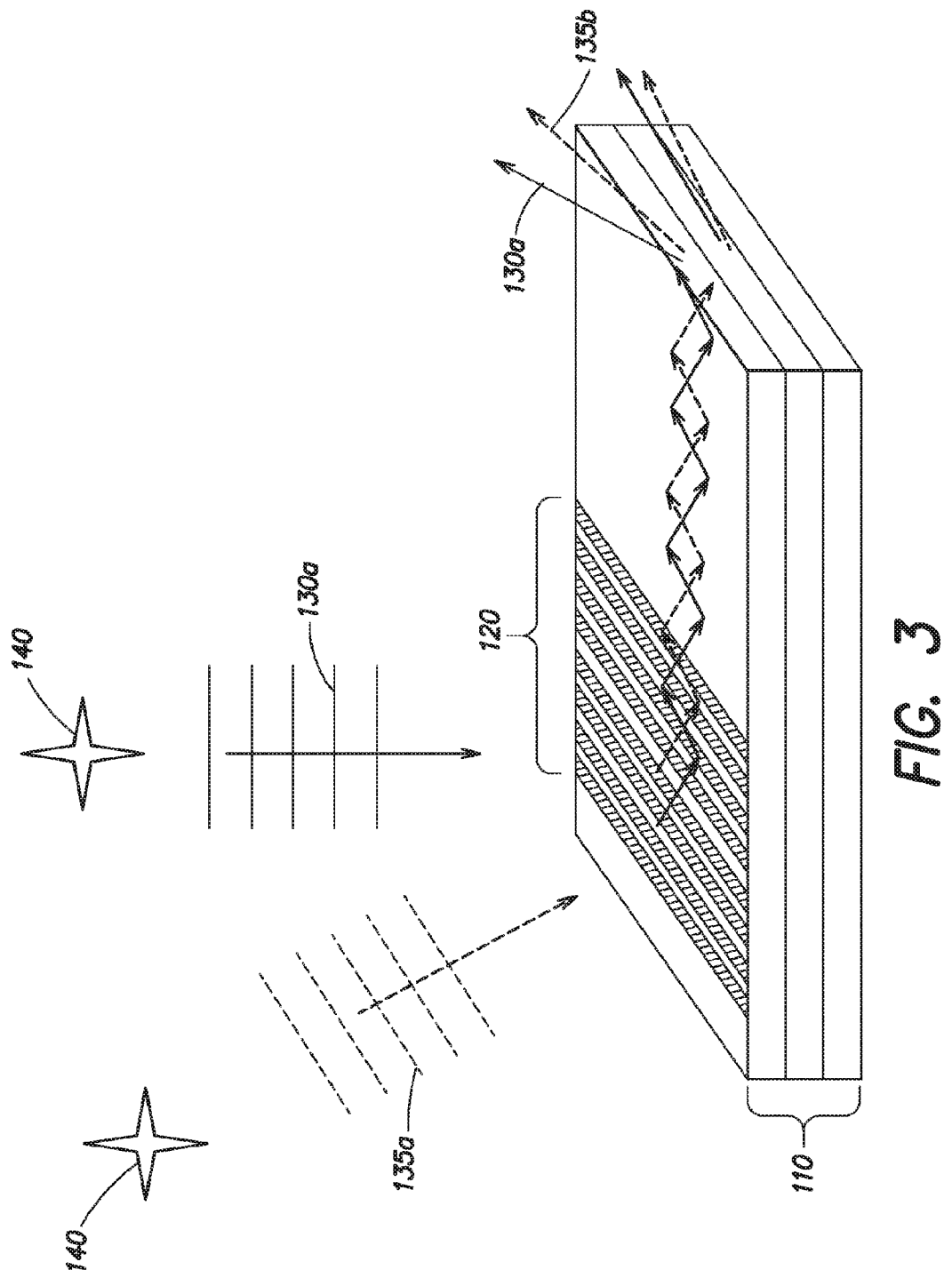

CHIP-SCALE STAR TRACKER

CROSS-REFERENCE TO RELATED APPLICATIONS

This application is a continuation of, and claims the benefit under 35 U.S.C. § 120 of, co-pending U.S. patent application Ser. No. 14/693,542, which is a continuation of U.S. patent application Ser. No. 13/930,032, now U.S. Pat. No. 9,019,509, each of which is herein incorporated by reference in its entirety for all purposes.

BACKGROUND

Traditional star trackers are high-performance imaging instruments that contain the optical and processing elements typically found in camera systems, such as an imaging sensor focal plane and a telescope. For far-field imaging, the diffraction equation establishes a direct relationship between maximum object angular resolution (and thus imaging performance) and the diameter of the optical aperture. Accordingly, the telescope of a star tracker must generally have a fairly large aperture diameter in order to collect a sufficient amount of starlight to achieve reasonable imaging performance. As a result, the focal length (and physical length) of the telescope must be substantial as well. Thus, traditional star trackers are typically large in size, and bulky.

SUMMARY OF INVENTION

Aspects and embodiments are directed to a miniaturized star tracker (also referred to as a star camera) in which traditional optics are replaced with a wafer-based structures, providing a system that has a large light collection aperture on a wafer-thin substrate. This combination may enable conformal mounting on a spacecraft or other vehicle. According to certain embodiments, and as discussed in more detail below, the "chip-scale star tracker" captures planewave starlight propagating in free space with a wafer-thin angle-sensitive broadband filter-aperture, and directs the light into a lightguide structure for readout. In some example, the chip-scale star tracker is less than 1 millimeter thick, thus providing a true wafer process solution to an optical imaging task.

According to one embodiment, a star tracker comprises a lightguide, a coupling system disposed on a surface of the lightguide and configured to couple starlight into the lightguide such that a mode of propagation of the starlight in the lightguide is at least partially determined by an angle of incidence of the starlight on the coupling system, and a detector system coupled to the lightguide and configured to analyze the starlight propagated in the lightguide to determine at least one of an azimuth angle and an elevation angle of a star that is a source of the starlight.

In one example of the star tracker, the lightguide is a multimode waveguide comprised of at least one dielectric layer of a wafer substrate. The wafer substrate may be a silicon wafer, for example. A refractive index of the at least one dielectric layer may be tapered to prevent propagation in the lightguide of light incident on the coupling system from a predetermined range of angles relative to the normal to the surface of the lightguide. In one example the coupling system comprises a broadband grating coupler patterned on the surface of the lightguide. In another example the wafer substrate includes a plurality of output optical apertures connected to the lightguide, and the star tracker further comprises an interferometer selectively coupled to a pair of the plurality of output optical apertures and configured to determine a phase difference between the starlight propagated via the lightguide to each of the pair of the plurality of output optical apertures. The star tracker may further comprise an optical switch coupled to the plurality of output optical apertures and configured to selectively couple the pair of the plurality of output optical apertures to the interferometer. The star tracker may further comprise a processor coupled to the interferometer and configured to reconstruct an image from phase information determined by the interferometer. In one example the plurality of output optical apertures are arranged along two axes that intersect one another at an angle of approximately 90 degrees.

According to another embodiment a method of imaging a star field comprises coupling starlight from at least one star into a planar lightguide, propagating the starlight via the lightguide to a detector system, wherein a mode of propagation of the starlight in the lightguide is based at least in part on an angle of incidence of the starlight on a surface of the lightguide, and determining at least one of an azimuth angle and an elevation angle of the at least one star based on detected characteristics of the starlight.

In one example of the method coupling the starlight into the lightguide includes coupling the starlight into the lightguide using a grating coupler patterned on the surface of the lightguide. In another example propagating the starlight includes propagating the starlight via the lightguide to a pair of optical apertures. In this example the method may further comprise interferometrically measuring a phase difference between the starlight at each of the pair of optical apertures.

According to another embodiment a star tracker comprises a wafer substrate including at least one dielectric layer, a coupling structure patterned on a surface of the wafer substrate and configured to couple starlight into the at least one dielectric layer of the wafer substrate, at least one readout waveguide configured to propagate the starlight coupled into the at least one dielectric layer by the coupling structure, wherein a mode of propagation of the starlight in the waveguide is at least partially determined by an angle of incidence of the starlight on the coupling structure, and a detector system coupled to the at least one readout waveguide and configured to analyze the starlight propagated in the multimode waveguide to determine at least one of an azimuth angle and an elevation angle of a star that is a source of the starlight.

In one example the coupling structure is circularly symmetric on the surface of the wafer substrate. In another example the at least one readout waveguide includes a plurality of readout waveguides positioned around the coupling structure along a perimeter of the wafer substrate. The wafer substrate may be a silicon wafer, for example. The coupling structure may include a broadband waveguide grating coupler, for example. In one example the star tracker further comprises a plurality of optical apertures positioned on the wafer substrate and coupled to the at least one readout waveguide, an interferometer coupled to the detector system, and an optical switch coupled to the plurality of optical apertures and configured to selectively couple a pair of the plurality of optical apertures to the interferometer. The star tracker may further comprise a corresponding plurality of optical path length control elements, each associated with a respective one of the optical apertures.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3 is a schematic diagram of another example of a chip-scale star tracker according to aspects of the invention;

DETAILED DESCRIPTION

Figure 1:
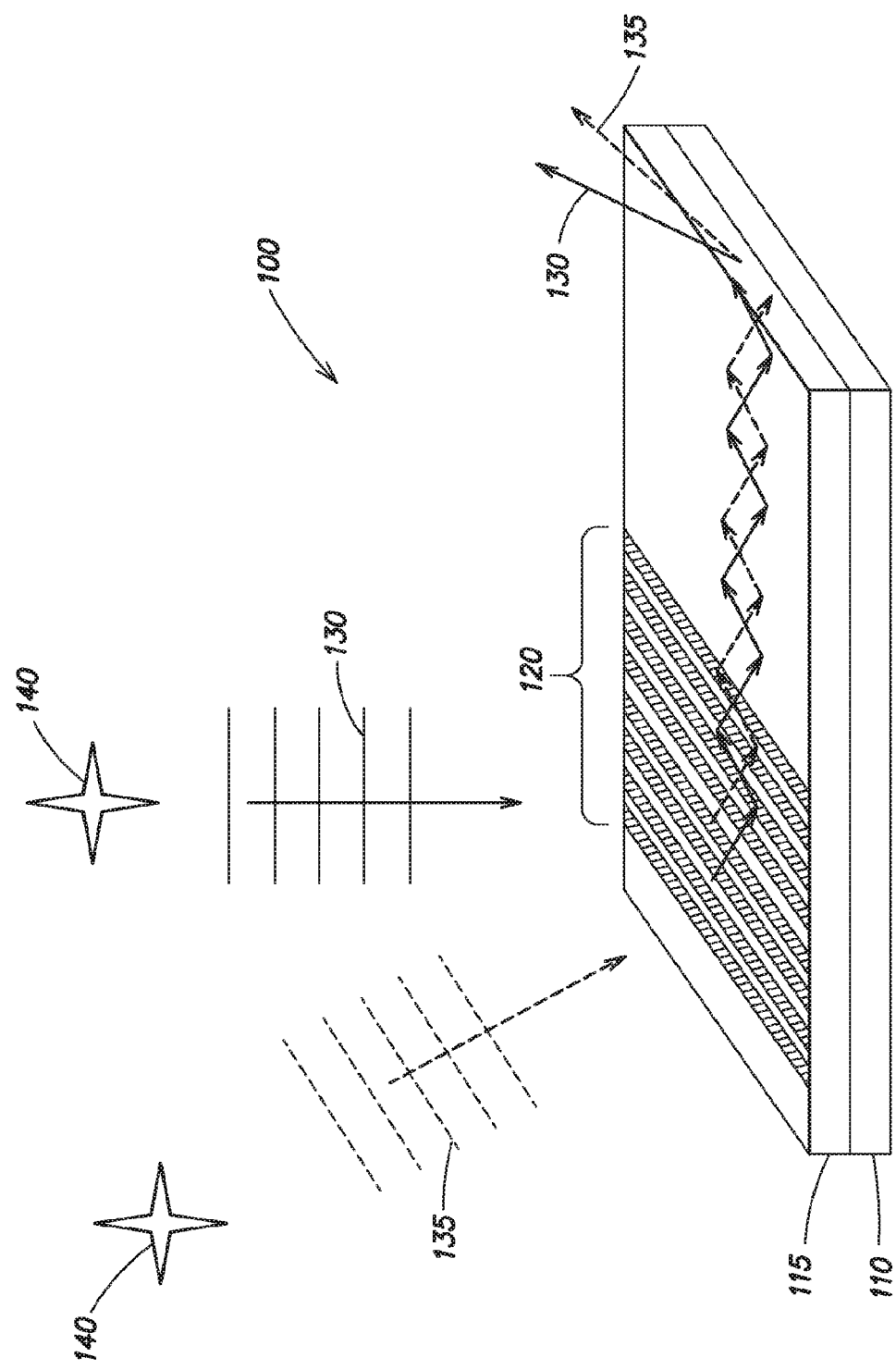
FIG. 1 is a schematic diagram of one example of a chip-scale star tracker according to aspects of the invention.

As discussed above, traditional star trackers are typically large due to the need for a large optical aperture to achieve sufficiently high resolution imaging, which generally results in the system having a large focal (and physical) length. However, in many applications it may be desirable to minimize the size and weight of the star tracker system. In a chip-scale star tracker system according to aspects and embodiments of the present invention, focal length has no meaning because the light is not imaged as in a traditional lens or mirror based system, but is instead coupled and filtered into a planar light-guide structure patterned on a layered wafer substrate. The captured light propagates within the wafer material and is detected at the edges of the wafer with low noise photo-detectors. The detected light is analyzed to obtain the detailed propagation characteristics which determine the star angle, as discussed further below. Thus, aspects and embodiments are directed to a star tracker in which waveguide-based light collection and analysis techniques are used to remove the need for a large telescope, thereby achieving a system that retains a large optical aperture for light collection, while eliminating many of the large and sometimes heavy optical elements associated with traditional star trackers.

It is well established that free-space light can be coupled into a waveguide through the use of a diffraction grating disposed on a surface of the waveguide. This concept is known as "grating coupling." Aspects and embodiments are directed to a chip-scale star tracker that uses the concept of grating coupling to collect starlight with a planar waveguide, thereby removing the need for a traditional optical telescope to collect and focus the light. Unlike traditional star trackers, embodiments of the chip-scale star tracker discussed herein do not directly "image" the stars, but rather couple the starlight into light guides which are then interrogated for star angle information, as discussed further below. Particular coupling modalities may be used to extract information from the collected starlight and create images of individual stars or a star field. Additionally, "baffling," or the elimination of stray light from extreme angles which would otherwise contribute to noise in the measurements, may be accomplished inside the light guides. Furthermore, according to certain embodiments, the incorporation of white-light interferometry into a chip-scale star camera platform may provide improved angular accuracy to star imaging, as also discussed in more detail below. These and other aspects may provide for a chip-scale star tracker in which the complete optical system may be as thin as a silicon wafer.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, there is illustrated a schematic diagram of one example of the optical system for a chip-scale star tracker according to one embodiment. The optical system 100 of the chip-scale star tracker includes a multi-layer wafer substrate 110, at least one layer of which acts as a light guide (or waveguide) acts as a planar dielectric waveguide 115 to propagate starlight 130, 135 in one or more spatial propagation modes, as discussed further below. In one embodiment, the waveguide 115 is a multi-mode waveguide capable of supporting multiple spatial modes of propagation of light. In one example, the wafer substrate 110 is a sub-millimeter-thin wafer. The wafer materials may include any material that has broadband optical transparency such that it is capable of transmitting the starlight 130, 135. In certain examples the waveguide includes one or more dielectric layers of the wafer substrate 110; however, in other examples the waveguide may be a hollow waveguide, or may include metallic grating structures, metamaterial structures, or other waveguide forms.

The wafer substrate 110 includes a coupling structure 120, which may include an array of micro-optical elements, configured to couple the starlight 130, 135 into the waveguide 115. In one example, the coupling structure 120 is patterned on the surface of the wafer substrate 110. In one embodiment, the coupling structure 120 includes a sub-wavelength broadband grating configured to couple the broadband starlight 130, 135 into the waveguide 115. However, it will be appreciated by those skilled in the art, given the benefit of this disclosure, that embodiments of the chip-scale star tracker are not limited to the use of a grating coupler. For example, the coupling structure 120 may include any of waveguide gratings, optical nanoantennas, photonic crystals, nanomaterials, negative-refractive index materials, and the like.

Figure 2A:
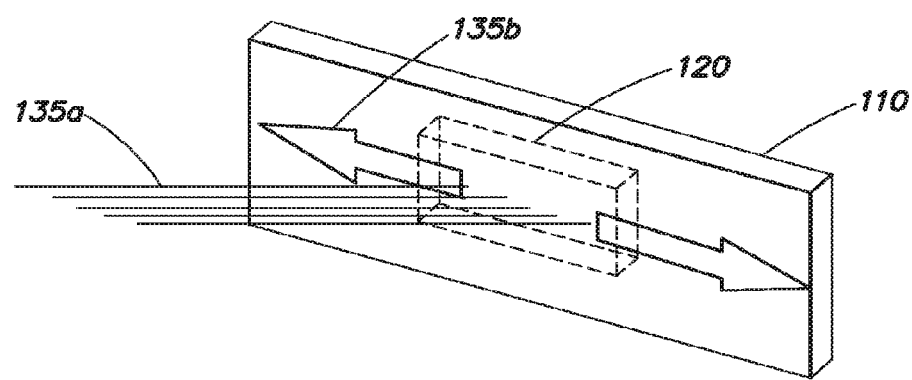
FIG. 2A is a schematic diagram showing a perspective view of waveguide grating coupling.
Figure 2B:
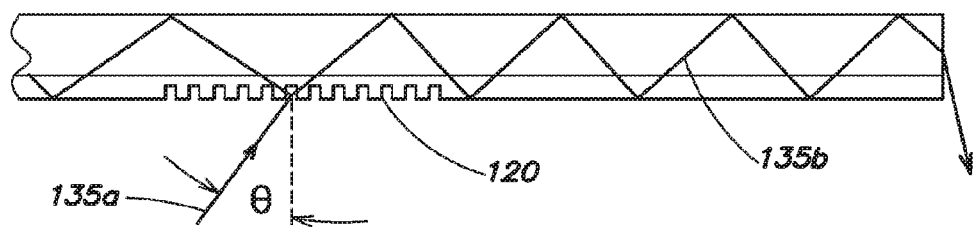
FIG. 2B is a schematic diagram showing a top view of the waveguide grating coupling, corresponding to FIG. 2A.
Figure 4A:
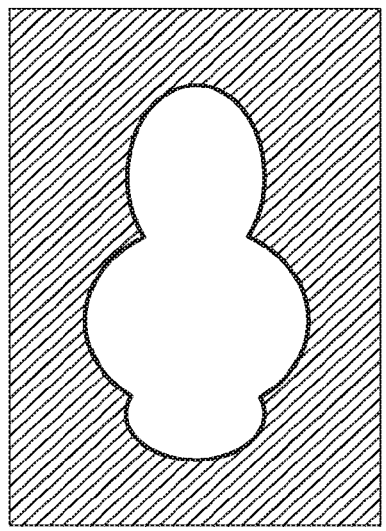
FIG. 4A is a diagram of one example of a notional supermodal exit pattern corresponding to light coupled into the waveguide from a first input angle.
Figure 4B:
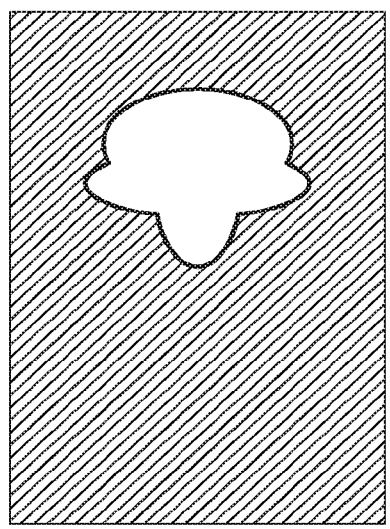
FIG. 4B is a diagram of another example of a notional super modal exit pattern corresponding to light coupled into the waveguide from a second, different, input angle.

Starlight 130, 135 emanates from stars 140 as an initially approximately circular wavefront. However, since the stars 140 are very distant, and because the optical system 100 is small, the starlight 130, 135 is essentially a perfect plane wave when it arrives at the optical system. Referring to FIGS. 2A and 2B, and considering the starlight 135 as an example, the free space plane wave 135a is perturbed by a broadband-coupler array structure 120 patterned on the surface of the wafer substrate 110, as discussed above, thereby redirecting the coupled light 135b into layers of light guides located underneath the coupling structure 120 and that are oriented roughly perpendicular to the wafer normal. The redirected light 135b is distributed into combinations of propagation paths based on the original approach angle θ and the wavelength of the light. For example, referring to FIG. 3, which illustrates an example of an optical system wherein the wafer substrate 110 includes multiple layers beneath the coupling structure 120, starlight 130, 135 incident on the coupling structure 120 from different input angles may be coupled into different spatial modes in the wafer 110. The redirected light 130b, 135b travels in a "supermodal pattern" along the light guides to the edge of the wafer substrate 110, as illustrated schematically in FIGS. 2B and 3. The supermodal pattern may then be sampled by photo-sensitive detectors (not shown), to capture precise modal characteristics from which propagation constants and then approach angles (θ) can be derived. FIGS. 4A and 4B illustrate notional supermodal exit patterns at the output of the light guide(s) representing two different input angles of the starlight. In one example, the photo-sensitive detectors are very-low-noise sensor pixels, optionally positioned both at the edge and under the wafer. Thus, the discrete modes of the waveguide provide angular imaging resolution, and star azimuth and elevation angle may be determined accurately from the angular extent of light propagating in the wafer substrate 110.

An important design feature in all star trackers or cameras is the "sun shade" and/or "baffles," which are used to eliminate stray light arriving at extreme angles from outside of the field of view of the camera. For the wafer-thin chip-scale star tracker embodiments discussed herein, an external sun shade, as may be used with conventional star trackers, may be far too large. However, direct sunlight impinging on the optics plane may result in far too high a level of background noise that would negatively impact the imaging performance of the star tracker. Accordingly, in certain embodiments of the chip-scale star tracker, baffling is accomplished inside the light-guide structure 115 of the wafer 110, with micro-optics and by modifying the effective index of the wafer through tapering. Specifically, intra-chip baffles are used to maneuver stray light out of the detection path. According to one embodiment, the baffles operate by segregating light based on the propagation constant, as discussed further below. Thus, light outside of the numerical aperture of the layer structure will not be coupled into the detection layers, while vertical propagation path shifts remove any scattered light from the detection plane.

Figure 5A:
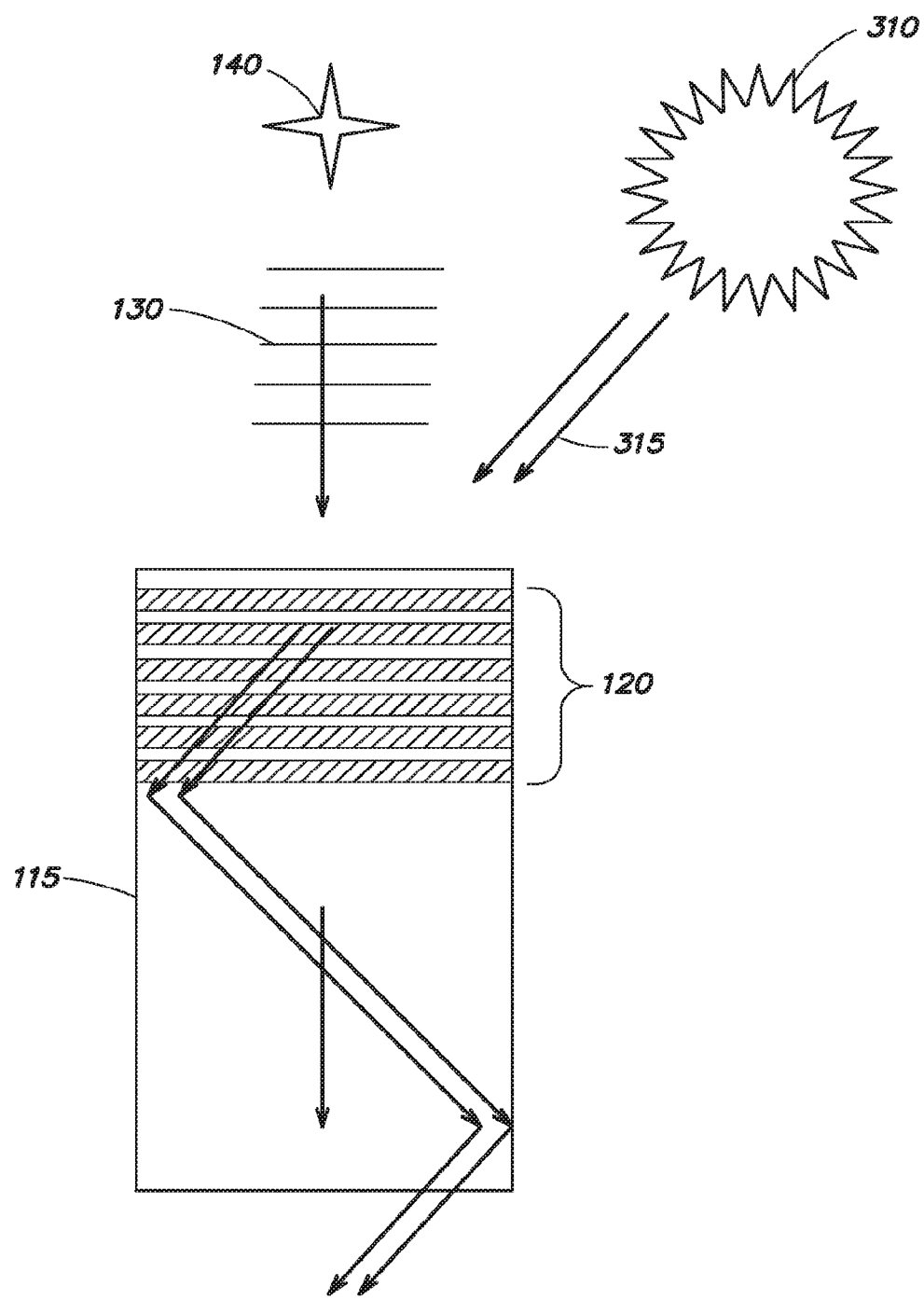
FIG. 5A is a schematic diagram showing a top view of another example of a chip-scale star tracker according to aspects of the invention.
Figure 5B:
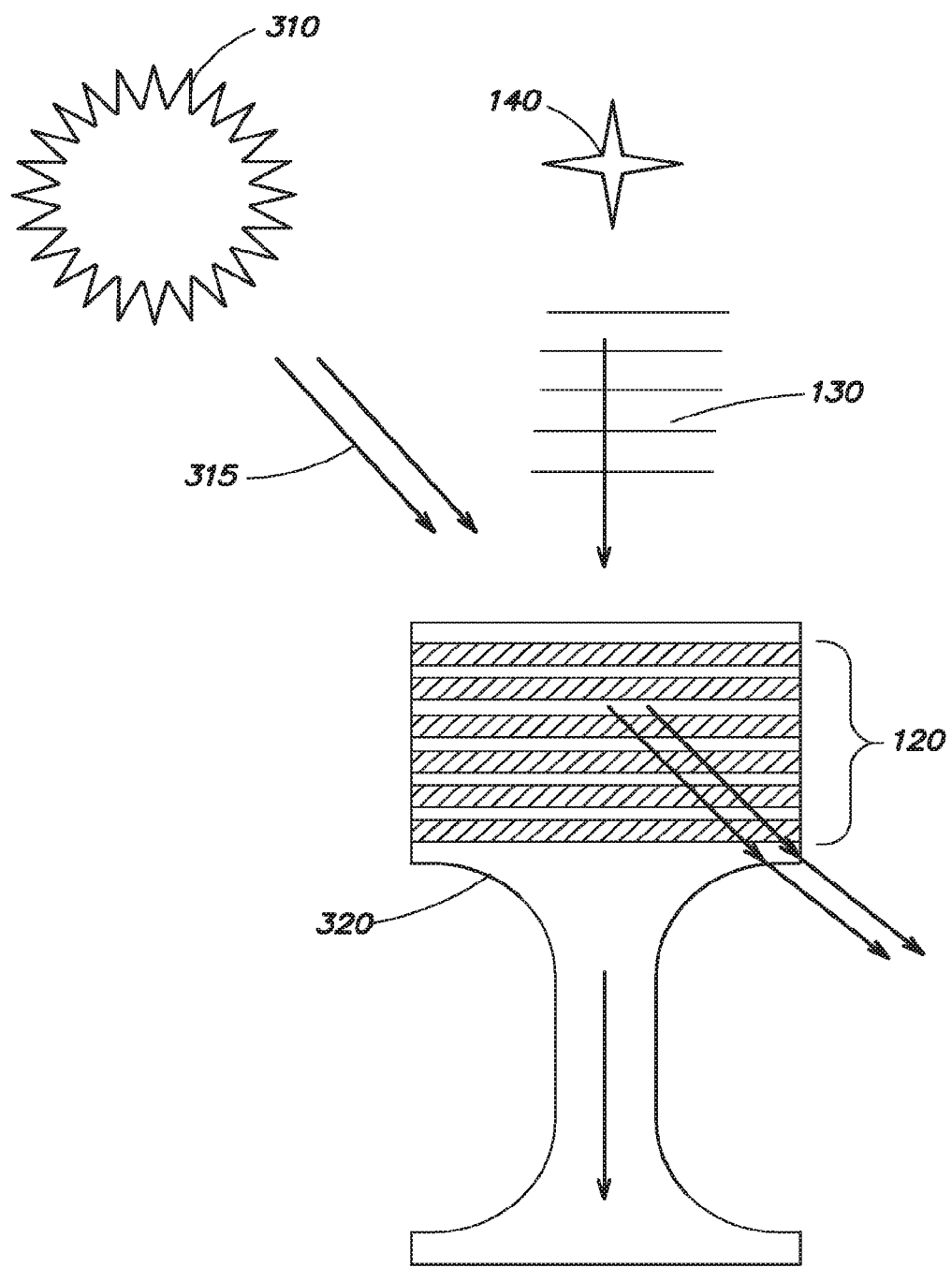
FIG. 5B is a schematic diagram showing a top view of another example of a chip-scale star tracker including light baffles according to aspects of the invention.

Referring to FIGS. 5A and 5B, there are illustrated, schematically, top views of two examples of a chip scale star tracker according to certain embodiments. FIG. 5A illustrates an example of the basic chip-scale star tracker concept as discussed above with respect to FIGS. 1 and 3, and FIG. 5B illustrates an example of a chip-scale star tracker including tapered-index internal baffles. Referring to FIG. 5A, starlight 130 arriving at an angle (illustrated as a near-normal angle of incidence) with the field-of-view of the system is coupled into the planar waveguide 115 by a grating coupler (or other coupling device) 120 and propagates in the waveguide, as discussed above. However, stray light, such as sunlight 315 from the sun 310, is also coupled into the waveguide 115 via the coupling structure 120 and may propagate to the output of the waveguide along with the starlight 130, as shown.

To address this concern, the waveguide may be tapered and designed to strongly favor light in the field-of-view, while discarding most stray light arriving from outside of the field-of-view, as shown in FIG. 5B. Specifically, according to one embodiment, the waveguide 320 is formed with a tapered refractive index such that certain spatial modes do not propagate to the output of the waveguide. Those skilled in the art will appreciate, given the benefit of this disclosure, that the waveguide 320 may not have a physical taper, as illustrated, but rather the "taper" is achieved by varying the refractive index of the layer(s) used to form the waveguide in the wafer 110. As discussed above, at least for certain angles of incidence of the starlight 130, 135, the coupled light propagates through the waveguide in a "zig-zag" manner, as illustrated in FIG. 2B, with the light waves confined to the dielectric by total internal reflection at its surface. Light coupled into the waveguide 320 from different angles will propagate in different spatial modes, each mode having a different propagation constant. The propagation constant defines the angle or "sharpness" of the zig-zag path taken by the light waves as they propagate through the waveguide 320. The refractive index of the material(s) forming the waveguide 320 may be selected such that light coupled in from very high angles of incidence (relative to the normal to the coupler), and thus having a propagation constant that defines a very "sharp" zig-zag (one having a high rate of repetition), fails the condition of total internal reflection necessary to support propagation through the waveguide. Accordingly, such light 315 is rejected out of the waveguide 320, as shown in FIG. 5B. In practical implementations of the design concept illustrated in FIG. 5B, the tapered structure may have stray light suppression characteristics in both azimuth and elevation.

Advances in wafer-fabrication capabilities allow for patterning the sub-wavelength array coupling structures 120 (in certain embodiments. effectively complex gratings) that are needed for angle-sensitive coupling to freely propagating broad-band light, as discussed above. By further angular filtering of this light, for example, by scanning the array coupling coefficient, and filtering in a planar layer stack, the input angle of the coupled plane wave may be detected with extreme angular resolution. In particular, according to one embodiment, the directionality of the grating coupling may be manipulated by realtime tuning (for example, by thermal tuning or charge-injection tuning, etc.), so that the coupling envelope scans across the star point source 140, providing an enhancement in angular resolution over the point source. The incoming plane wave is then distributed into lightguide layers with a propagation constant distribution, and the supermodal pattern is spatially sampled at the sensor planes, providing good angular readout sensitivity as discussed above. Additionally, in certain embodiments, particular tuning and scanning techniques (such as, but not limited to, charge-injection tuning, etc.) may permit coherence manipulation for improved performance. According to certain embodiments, the above discussion provides "elevation" angle resolution. In one embodiment, azimuthal selectivity is achieved through a circular-symmetry design approach, as discussed below.

Figure 6:
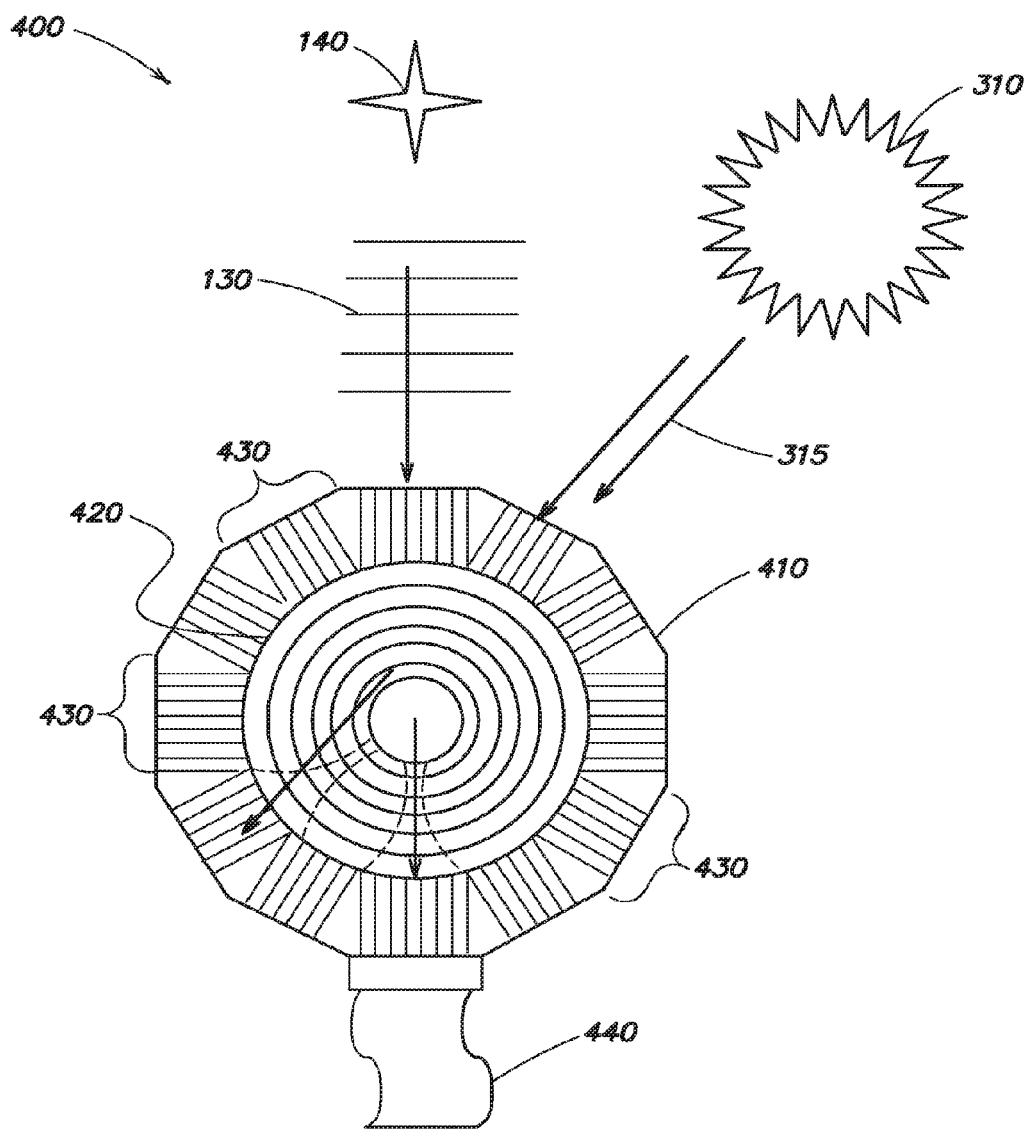
FIG. 6 is a schematic diagram of another example of a chip-scale star tracker according to aspects of the invention.

Referring to FIG. 6, there is illustrated (schematically) an example of a waveguide-based star tracker system that employs circular symmetry to enable both elevation and azimuth angular resolution. In this example, the system 400 includes a wafer substrate 410 that is patterned with a coupling system 420 that is surrounded at the perimeter of the substrate 410 by a plurality readout waveguides 430. In the illustrated example, the coupling system 320 is a circular waveguide grating, and the readout waveguides 430 are linear arrays. In one example, the substrate 410 is a silicon wafer; however, other materials may be used as discussed above. At least one of the readout waveguides 430 is coupled to readout circuitry 440, including a photodetector and associated circuitry capable of analyzing the light 130 propagated by the readout waveguide to determine the azimuth and elevation of the star 140 as discussed above. Each of readout waveguides 430 may be positioned and configured to accept a particular mode of propagation, or coupled light incident on the coupling system 420 from a particular angle in elevation or azimuth. Thus, the circular coupling system 420 may be configured to near-hemispherical light collection, and the array of readout waveguides 430 may be used to distribute the coupled light into azimuth and elevation "bins." The light propagated by each readout waveguide 430 may be detected and the resulting signal processed by the associated readout circuitry 440. The signals from each readout circuitry 440 may be processed to produce an image of the star field, for example, from the azimuth and elevation information extracted from the light propagated by the readout waveguides 430.

The coupling system 420 may include tapering, as discussed above with reference to FIG. 5B, to reject stray light arriving from outside of the field-of-view of the readout circuitry 440 associated with a corresponding readout waveguide 430. For example, starlight 130 which may be approximately normally incident (in elevation angle) on the coupling system 420 may propagate via a readout waveguide 430 to the readout circuitry 440. However, sunlight 315 which may incident at a high angle (in elevation) relative to the normal to the surface of the coupling system 420 may be rejected by the taper. According to certain examples, the coupling system 420 may be tuned to favor light from certain elevation angles, for example, by tuning the refractive index of the waveguide material to change the taper characteristics based on thermal or electrical tuning. Thus, the coupling system 420 may be configured to accept starlight 130 from certain elevation angles, while rejecting sunlight 315 from other elevation angles, even the azimuth angle is the same or very similar.

Figure 7:
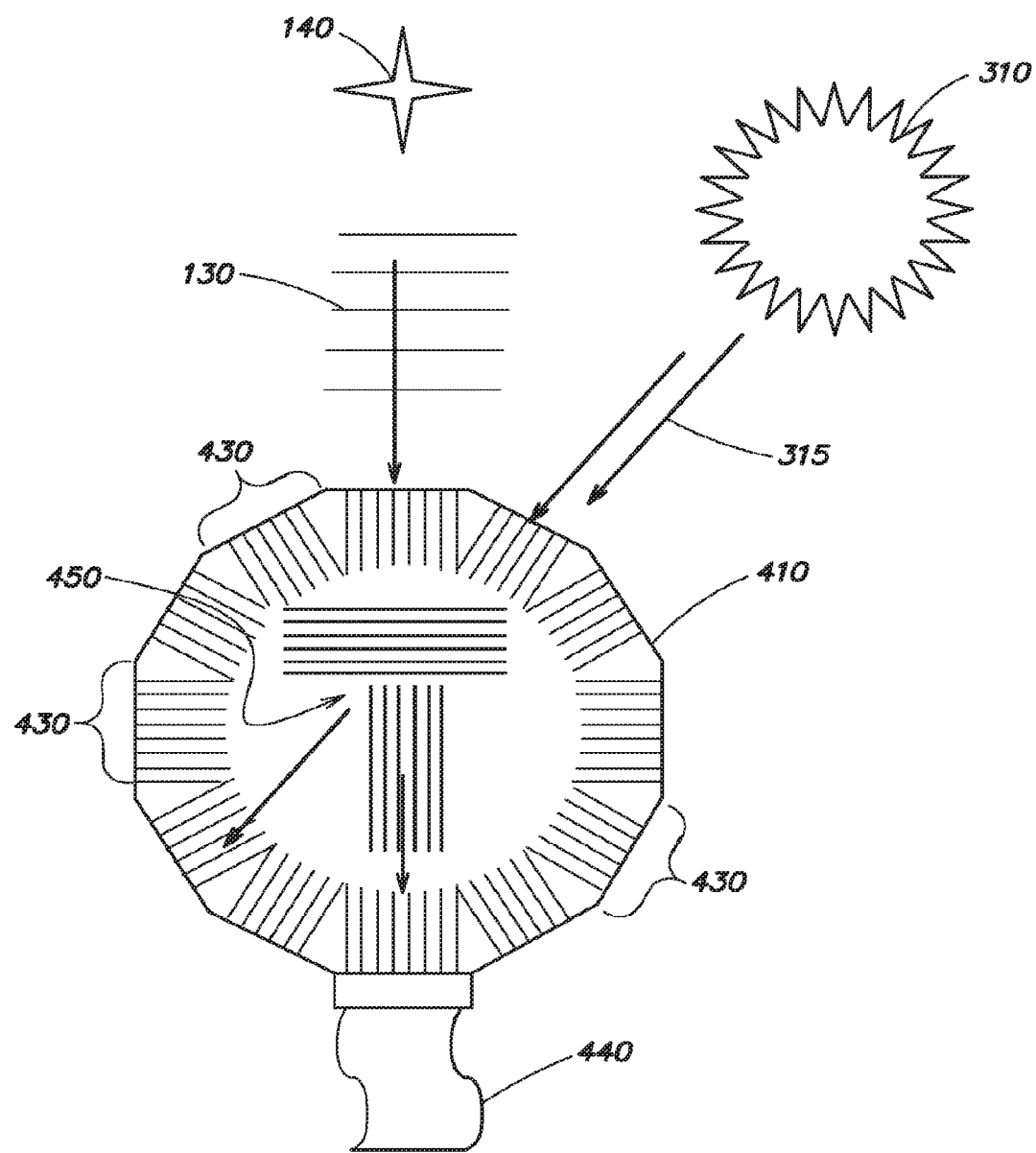
FIG. 7 is a schematic diagram of another example of a chip-scale star tracker according to aspects of the invention.

In the example illustrated in FIG. 6, the coupling system 420 is circularly symmetric to allow for near-hemispherical light collection. In another embodiment, the coupling system may be configured and tunable for directional scanning. For example, referring to FIG. 7 there is illustrated another example of a star tracker system in which the wafer 410 includes tunable coupling structures 450 for directional scanning. Although not illustrated in FIG. 7, the coupling structures 450 may also be tapered as discussed above to favor light from certain input angles.

Thus, aspects and embodiments may provide a wafer-thin star tracker that removes the need for the large telescope optics and baffles typically used in conventional star camera systems in favor of a light-guide system in which free-space light is coupled into a wafer or waveguide. In particular, aspects and embodiments provide a star tracker in which starlight is coupled into a light guide that confines the starlight and guides it to detectors that map the angular extent of the confined propagation. From this angular map, the azimuth and elevation angles of the target stars may be determined. No image-forming/focusing optics, or sensor arrays, may be used in the system; instead, star elevation and azimuth information is gleaned from the characteristics of light propagating in the guide(s). As discussed above, the coupling system may include any of photonic crystals, nanomaterials, nanoantennas, negative-refractive index materials, optical antennas, and waveguide gratings.

In addition, certain aspects and embodiments are directed to a wafer-scale long-baseline broadband multi-aperture interferometric imaging system, and in particular, to the use of on-chip white-light interferometry in a chip-scale star tracker. In one embodiment, such an imaging system includes a coupling system that may be used to couple starlight into a wafer as discussed above. The wafer includes multiple output apertures positioned throughout the wafer that are switched into various baseline combinations, and which lead into chip-scale white light interferometers. Each interferometer may be configured to determine the phase difference between two apertures at a time (a single point in the Fourier domain). An image may then be reconstructed from many different baseline pairs of apertures. In one embodiment, on-chip phase tuning may be implemented for path length matching, as well as spectral sampling for processing the light in narrow spectral bands. Such a wafer-scale interferometric imaging capability may provide very high angular resolution in imaging of the star(s) 140.

Figure 8:
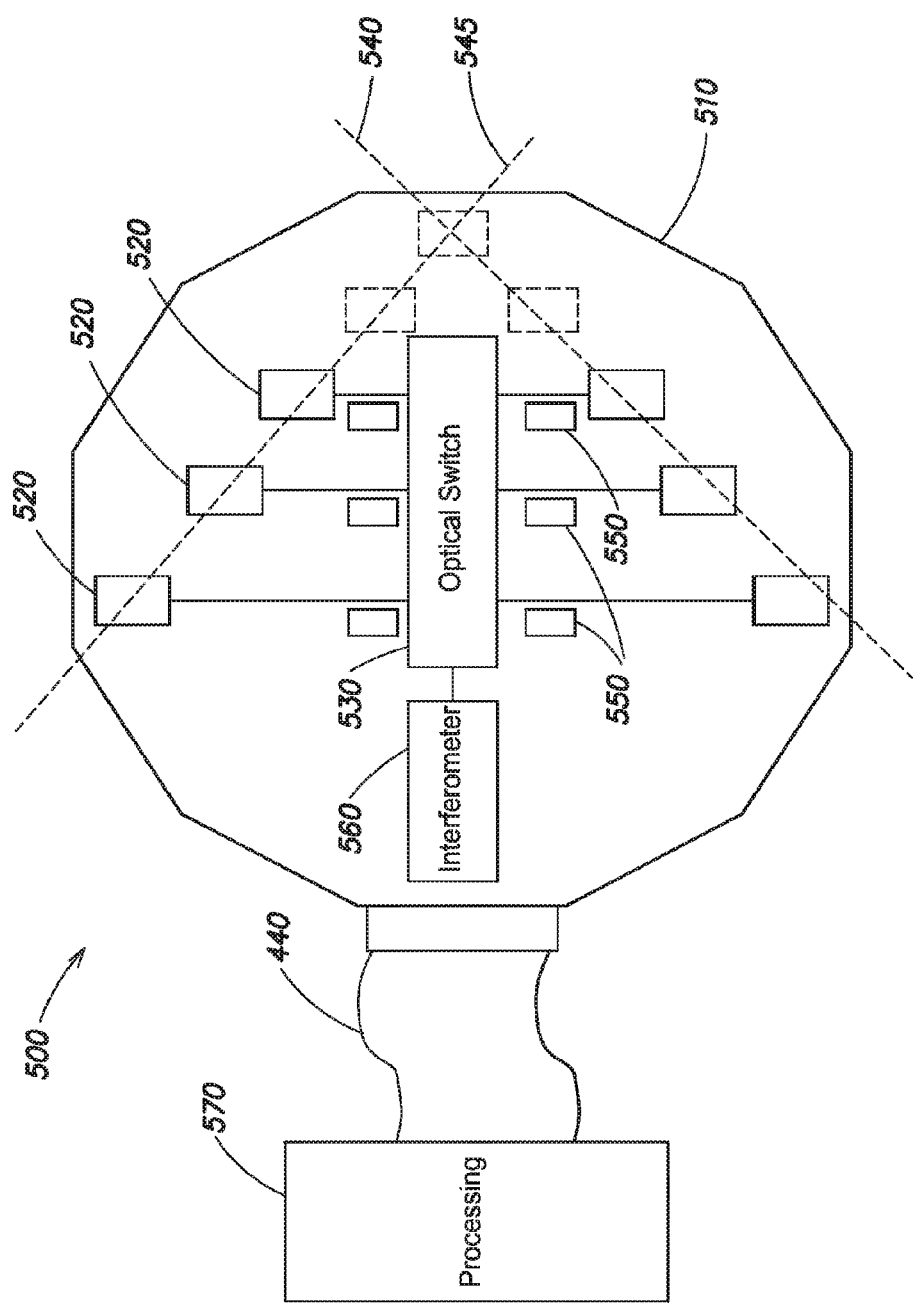
FIG. 8 is a schematic diagram of another example of a chip-scale star tracker incorporating white light interferometry according to aspects of the invention.

For example, referring to FIG. 8, there is illustrated (schematically) a chip-scale star tracker 500 configured for white light interferometry according to one embodiment. The wafer substrate 510 includes a plurality of optical coupling apertures 520 that are connected to an optical switch 530. In one example the optical coupling apertures 520 are arranged along axes 540, 545 that intersect one another at an angle of approximately 90 degrees, as shown in FIG. 8. Waveguide-based phase tuning via optical path length control elements 550 may provide precise optical path-length matching and dispersion management. Each optical coupling aperture may be optically paired with any other aperture, and fed into an interferometer 560. The optical switch 530 selects which pair of apertures is fed to the interferometer 560 at any given time. In one example, the interferometer characterizes broadly distributed spectral fringes. Corresponding images may be reconstructed using a processor 570. Embodiments of the chip scale star tracker 500 may be used to cover a full range of spatial frequencies, where "full range of spatial frequencies" is defined as the range between and including the maximum and minimum possible distance between coupling apertures 520 that can be supported by the wafer geometry. Additionally, all possible angular axes may be covered by the ~90 degree arrangement illustrated in FIG. 8.

Thus, aspects and embodiments may provide a solution for the creation of a highly angle-sensitive optic for reading out the arrival angle of an incoming optical plane wave, while simultaneously packaging the entire optical path into a wafer-thin structure. As discussed above, the wafer-thin optical system interacts with the wave front, and couples light over a broad bandwidth to allow for star imaging. Additionally, the optical system may perform filtering and phase tuning, and may allow for propagation-constant based baffling as discussed above. The coupling system may include sub-wavelength structures patterned on the wafer which includes the light guides, as also discussed above. This patterning may be accomplished using modern wafer-scale optical design and fabrication processes, including silicon photonics and metallic optical nanoantennas.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A star tracker comprising:
   a lightguide;
   a coupling structure disposed on a surface of the lightguide and configured to couple starlight into the lightguide such that a mode of propagation of the starlight in the lightguide is at least partially determined by an angle of incidence of the starlight on the coupling system; and
   a baffle system integrated with the lightguide and configured to prevent propagation in the lightguide of light incident on the coupling structure from a predetermined range of angles of incidence.

2. The star tracker of claim 1 wherein the lightguide includes a dielectric material and the baffle system comprises a tapered refractive index of the dielectric material.

3. The star tracker of claim 1 wherein a dielectric material of at least one of the lightguide, the coupling structure, and the baffle system includes a tunable refractive index.

4. The star tracker of claim 1 further comprising a detector system coupled to the lightguide and configured to analyze the starlight propagated in the lightguide to determine at least one of an azimuth angle and an elevation angle of a star that is a source of the starlight.

5. The star tracker of claim 1 wherein the lightguide includes a plurality of output apertures, and further comprising an interferometer coupled to the lightguide and configured to determine phase information of the starlight propagated through at least two output apertures of the plurality of output apertures.

6. The star tracker of claim 1 further comprising:
   a plurality of optical apertures coupled to the lightguide;
   an interferometer selectively coupled to a pair of the plurality of optical apertures and configured to determine a phase difference between the starlight propagated via the lightguide to each of the pair of the plurality of optical apertures; and
   an optical switch coupled to the plurality of optical apertures and configured to selectively couple the pair of the plurality of optical apertures to the interferometer.

7. A star tracker comprising:
   a lightguide;
   a coupling structure disposed on a surface of the lightguide and configured to couple starlight into the lightguide such that a mode of propagation of the starlight in the lightguide is at least partially determined by an angle of incidence of the starlight on the coupling system;
   a pair of optical apertures coupled to the lightguide, each configured to propagate a portion of the starlight; and
   an interferometer configured to determine phase information of the starlight propagated through each of the pair of optical apertures.

8. The star tracker of claim 7 wherein a dielectric material of at least one of the lightguide, the coupling structure, and the interferometer includes a tunable refractive index.

9. The star tracker of claim 7 further comprising a processor coupled to the interferometer and configured to construct an image based on the phase information.

10. The star tracker of claim 7 further comprising a detector system coupled to the lightguide and configured to analyze the starlight propagated in the lightguide to determine at least one of an azimuth angle and an elevation angle of a star that is a source of the starlight.

11. A method of capturing starlight comprising:
    coupling starlight from at least one star into a lightguide;
    propagating the starlight via the lightguide, wherein a mode of propagation of the starlight in the lightguide is based at least in part on an angle of incidence of the starlight on a surface of the lightguide
    providing the starlight, propagated via the lightguide, at a pair of optical apertures; and
    determining phase information of the starlight provided at the pair of optical apertures.

12. The method of claim 11 further comprising determining at least one of an azimuth angle and an elevation angle of the at least one star based on detected characteristics of the starlight.

13. The method of claim 11 further comprising spectrally sampling the starlight into one or more spectral bands.

14. The method of claim 11 further comprising tuning a refractive index of a dielectric material of the lightguide.

15. The method of claim 11 further comprising controlling an optical path length of the starlight provided at at least one of the pair of optical apertures.

16. The method of claim 11 further comprising constructing an image using the phase information.

* * * * *